United States Patent [19]
Hara et al.

[11] Patent Number: 4,815,091
[45] Date of Patent: Mar. 21, 1989

[54] METAL VAPOR LASER

[75] Inventors: Kazuhiko Hara; Shigeo Ueguri; Akihiko Iwata; Tatsuki Okamoto; Yoshihiro Ueda, all of Amagasaki, Japan

[73] Assignee: Mitsubishi Denki Kabushiki Kaisha, Tokyo, Japan

[21] Appl. No.: 192,565

[22] Filed: May 11, 1988

[30] Foreign Application Priority Data

| | | | |
|---|---|---|---|
| May 11, 1987 | [JP] | Japan | 62-113816 |
| May 29, 1987 | [JP] | Japan | 62-136697 |
| Jun. 5, 1987 | [JP] | Japan | 62-141845 |
| Jul. 6, 1987 | [JP] | Japan | 62-167099 |
| Jul. 17, 1987 | [JP] | Japan | 62-179375 |

[51] Int. Cl.$^4$ .............................................. H01S 3/22
[52] U.S. Cl. ........................................ 372/56; 372/34; 372/61
[58] Field of Search ................ 372/56, 34, 61, 55, 372/98

[56] References Cited

U.S. PATENT DOCUMENTS 4,694,463  9/1987  Hirth et al. ............................ 372/34
4,736,379  4/1988  Barker et al. ......................... 372/34

OTHER PUBLICATIONS

Alger Benett "Sealed Copper Vapor Laser Assembly": Rev. Sci. Instrum. 53(6), Jun. 1982, pp. 762–764.
Shinkoku Koh, et al.; "Making of copper vapor laser"; Laser Kenkyo (Research of Laser head construction illustrated in FIGS. 2–4.

Primary Examiner—Léon Scott, Jr.
Attorney, Agent, or Firm—Lowe, Price, LeBlanc, Becker & Shur

[57] ABSTRACT

In a metal vapor laser, (e.g. copper vapor laser), the innermost heat shield (15) of Mo, Ta or W, which is disposed with a predetermined gap (preferably sufficiently larger than 0.3 mm) to the outer surface of the seal tube (8), is connected at respective ends to the anode terminal (2) and the anode (5), so that inductance of discharge load is considerably decreased.

18 Claims, 9 Drawing Sheets

METAL VAPOR LASER

FIELD OF THE INVENTION AND RELATED ART STATEMENT

1. Field of the Invention

The present invention relates to an improvement in metal vapor laser wherein a metal in a sealed chamber is heated to vapor state and excited by gas-discharging, thereby to produce laser output.

2. Description of the Related Art

Figure 1:
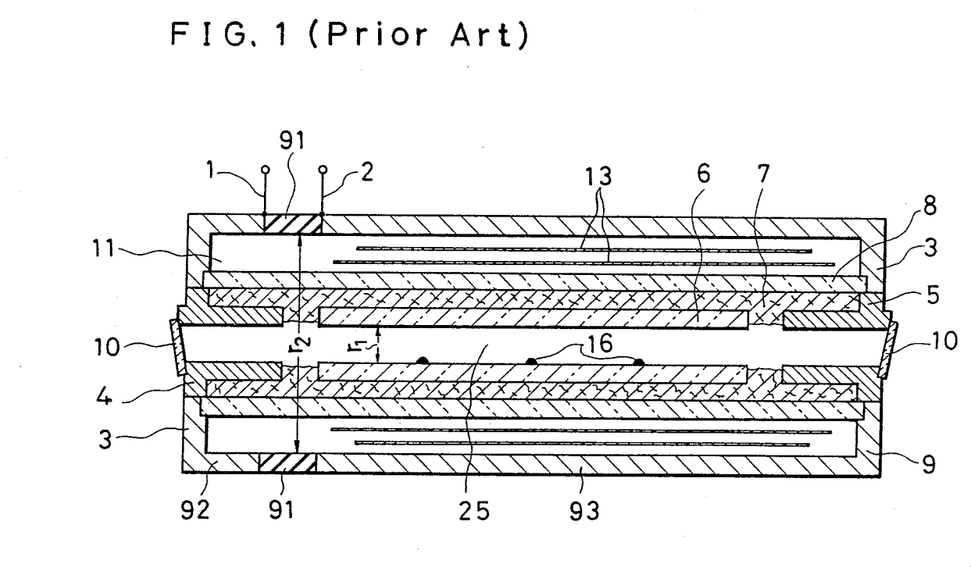
FIG. 1 is the sectional elevation view along the axis of the metal jacket of the metal vapor laser of the prior art.

The metal vapor laser of the prior art was disclosed, for instance, in an article Terry W. Alger et al., "Sealed copper vapor laser assembly", Rev. Sci. Instrum. 53(6), June 1982 (American Institute of Physics). The article discloses a metal vapor laser comprising, as shown by FIG. 1, a seal tube i of an insulative substance e.g. alumina for containing therein an anode 5 and a cathode 4 disposed apart each other in axial direction with a discharge region 25 therebetween, an outer metal jacket 9 enclosing the seal tube 8 therein with a vacuum space surrounding the seal table 8, the vacuum space 11 containing at least one heat shield 13 of tubular metal sheet provided around the seal tube 8 co-centrically thereto and apart each other with gaps therebetween. Heat insulator 7, e.g. of insulative fibrous substance such as wool of alumina or silica is provided inside the seal tube 8 and outside an inner tube 6 of the insulative material disposed to surround the discharge space 25 in order to prevent convection heat loss from the discharge region 25. Granules 16 of metal, such as copper, is provided in the inner tube 6. Both ends of the discharge region 25, that is, respective outside ends of the cathode 4 and the anode 5 are sealed with light-passing windows 10, 10.

The prior art has the following problems.

Since the prior art metal vapor laser has long outer metal jacket 9, the inductance L of the discharge load becomes large in proportion to inner diameter of the outer tube (9), thereby making feeding of current pulses of quick rises and falls difficult. This is described more in detail. When plural tubular heat shields 13 are provided in the vacuum space around the seal tube 8 with suitable spaces between each other, the inner diameter of the outer metal jacket 9 necessarily becomes large. In such configuration of the prior art apparatus of FIG. 1, the inductance L of the discharge load for a case when a constant current is fed to the discharge region 25 is expressed as $$L \propto l_n \frac{r_2}{r_1}, (1)$$

where $r_1$ is the inner diameter of the inner tube 6 and $r_2$ is the inner diameter of the outer metal jacket 9; the relation means that when the inner diameter $r_2$ of the outer metal jacket 9 is increased in order to contain plural layer of the tubular heat shields 13, the discharge load inductance increases.

Another problem of the prior art is that the heat conserving function of the tubular heat shield should be raised as effective as possible, in order to effectively keep the temperature of the discharge region 25 in the inner tube at about 1500° C. so as to sufficiently vaporize the metal granule 16 with as small energy as possible. In order to attain such high temperature of the discharge region 25, heat loss should be decreased as small as possible, by improving means of heat shielding, so as not only to protect the heat loss through convection by the heat insulator 7, but also to decrease heat loss through conduction and radiation.

OBJECT AND SUMMARY OF THE INVENTION

Therefore, in order to solve the above-mentioned problems, the present invention purposes to provide an improved metal vapor laser capable of lasing with pulse current of very quick rise and fall by having low discharge load inductance, as well as having smaller heat loss from the discharge region.

The metal vapor laser in accordance with the present invention comprises:

a first electrode, a second electrode which are disposed apart each other in axial direction with a discharge region therebetween, a seal tube of an insulative substance for containing said first electrode and the second electrode therein, a predetermined amount of metal to be vaporized by discharging in the discharge region, a metal jacket enclosing the above-mentioned members therein and defining a vacuum space therein surrounding the seal tube, and at least one heat shield disposed in the vacuum space in a manner to surround the seal tube and apart from outer face of the seal tube and from each other, both ends of at least one of the heat shield being electrically connected to the metal jacket.

According to the above-mentioned constitution the discharge load inductance can be made small, thereby enabling operation by pulse current of quick rises and quick falls.

Further, the metal vapor laser in accordance with the present invention can be designed small, since the vacuum gap space between the inside wall of the outer metal jacket and the outside face of the inner tube can be made narrow by decreasing heat loss from the discharge region with limited number of heat shields.

In a species wherein a predetermined gap is formed between the outer face of the inner tube and the inner face of the tubular heat shield, a stable heat shielding function lasts for a long time, thereby prolonging life time of the laser apparatus.

DESCRIPTION OF THE PREFERRED EMBODIMENT

A preferred embodiment of the metal vapor laser in accordance with the present invention is described with reference to the accompanying drawings, particularly from FIG. 2 and thereafter.

Figure 2:
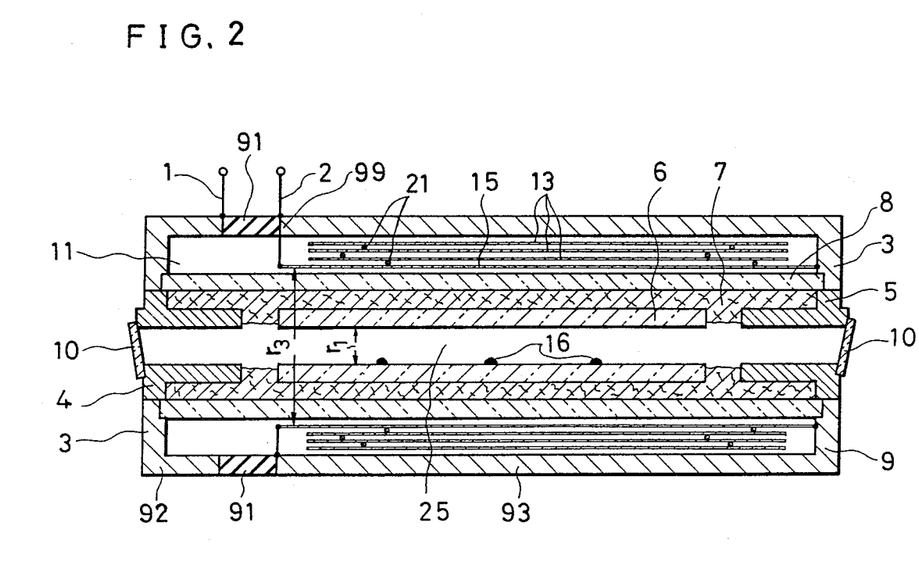
FIG. 2 is a sectional elevation view along axis of a metal jacket of a metal vapor laser of a first embodiment of the present invention.

FIG. 2 shows a first embodiment of a metal vapor laser. As shown in FIG. 2, the metal vapor laser comprises a seal tube 8 of an insulative material, a cathode 4 and an anode 5 disposed apart from each other in and at respective ends of the seal tube 8, an inner tube 6 of an insulative material and disposed between the cathode 4 and the anode 5 defining a discharge region therein, a heat insulator layer 7 filled in a gap between the seal tube 8 and the inner tube 6, cathod 4 and anode 5. Respective outside ends of the cathod 4 and the anode 5 are sealed by glass windows 10, 10. At least one, but usually plural tubular heat shields 13, 13, 13 and 15 are provided around the seal tube 8, keeping a predetermined uniform gap to the outer surface of the seal tube 8, and between plural heat shields 13 each other.

At least one of, but usually the innermost heat shield 15 extends from the position corresponding to the end of the anode 5 to the end of the inner tube 7, that opposes the inner part of the cathode 4. Respective ends of the innermost heat shield 15 are electrically connected to both ends of a main part 93 of the metal jacket 9. The metal jacket 9 has a smaller part 92 which is connected through an insulative part 91 to the main part 93. A cathode terminal 1 is connected to the smaller part 92 which is electrically connected to the end part of the cathode 4. An anode terminal 2 is connected to the main part 93, whose opposite end part (bottom part) 3 is connected to the end part of the anode 5.

The inner tube 6, the seal tube 8 and the insulative part 91 of the metal jacket 9 are made of heat-resistive ceramic material such as silica or alumina. The inner tube 6 contains a predetermined amount granules of metal such as copper to be vaporized at operation.

The heat shields 13, 13, 13 and 15 are made of heat-resistive metal such as tantalum, molybdenum or tungsten of about 50 μm–100 μm thickness, and the gap between neighboring heat shields are held uniformly by utilizing appropriate gap separators 21, 21 . . . . The gap separators may be of ceramic beads or coiled fine wires of a heat resistive metal. The innermost heat shield 13 is connected at one end to the bottom part 3 of the main part 93 of the metal jacket 9 and at the other end to the other end part 99 of the main part 93. The anode terminal 2 is connected to the end 99 of the metal jacket 9.

The operation of the metal vapor laser is as follows. When a high voltage pulse current is impressed across the anode terminal 2 and the cathode terminal 1, the discharge region 25 filled with known inert gas such as He or Ne is excited and a gas discharging is made therein, and thereby metal granules 16, such as copper granules are heated to melt and vaporized, thereby filling abundant copper vapor in the discharge region 25. By further application of the high voltage pulse current, inverse distribution is formed in particular energy levels of the copper atoms, and laser oscillation starts by using known external mirrors which are not shown. For the above-mentioned laser oscillation, temperature of the inner tube 6 must be retained about 1500° C. for stable raising. In order to achieve such high temperature by suppressing undesirable heat loss, the heat insulator 7 of fibrous ceramic material and vacuum space 11 between the seal tube 8 and the metal jacket 9 are provided for preventing convection heat loss, and further, plural heat shields 13, 13, 13 and 15 of tubular metal sheets are provided for preventing radiation heat loss.

The plural layers of tubular heat shields, which are held with predetermined gaps therebetween, effectively shields heat loss by reflection, thereby causing effective temperature rise of the discharge region 25.

Since respective ends of the innermost heat shield 15 are connected to the anode terminal 2 and through the bottom part 3 of the metal jacket 9 to the anode 5, when a DC current, which is usually a high voltage pulse current, is applied to this metal vapor laser apparatus, a discharge current flows from the anode terminal 2, through the metal jacket 9 at the anode terminal part 99, the innermost heat shield 15, bottom part 3 of the metal jacket 9, the anode 5, the discharge region 25, the cathode 4, the smaller part 92 of the metal jacket 9 and to the cathode terminal 1. Therefore the inductance of the discharge load L is given by the following expression:

$$L \propto l_n \frac{r_3}{r_1}, \quad (2)$$

where $r_1$ is the inner diameter of the inner tube 6 and $r_3$ is the inner diameter of the innermost heat shield 15. That is, the relation means that the inductance of the discharge load L of this embodiment is very much lower than that of the prior art of FIG. 1, where $r_2$ which is larger than $r_3$ of the expression (2) of this embodiment determines larger inductance of the discharge load in accordance with the expression (1). In other words, by utilizing the innermost heat shield 15 as a conductor from the anode terminal to the anode 5, the radius of the conductor for the anode current from the anode terminal 2 to the anode is drastically decreased than that of the metal jacket 9. Therefore, the inductance of the discharge load is considerably decreased. Such decrease of the inductance of the discharge load enables operation of the metal vapor laser by a high frequency pulse current, and therefore satisfactory characteristic of operation is obtainable.

Though the connection at both ends of the innermost heat shield 15 is most effective to decrease the inductance of discharge load, connection of other heatshied, such as next one to the innermost one, also results in decrease of the inductance of their smaller radius than the metal jacket 9.

Figure 3:
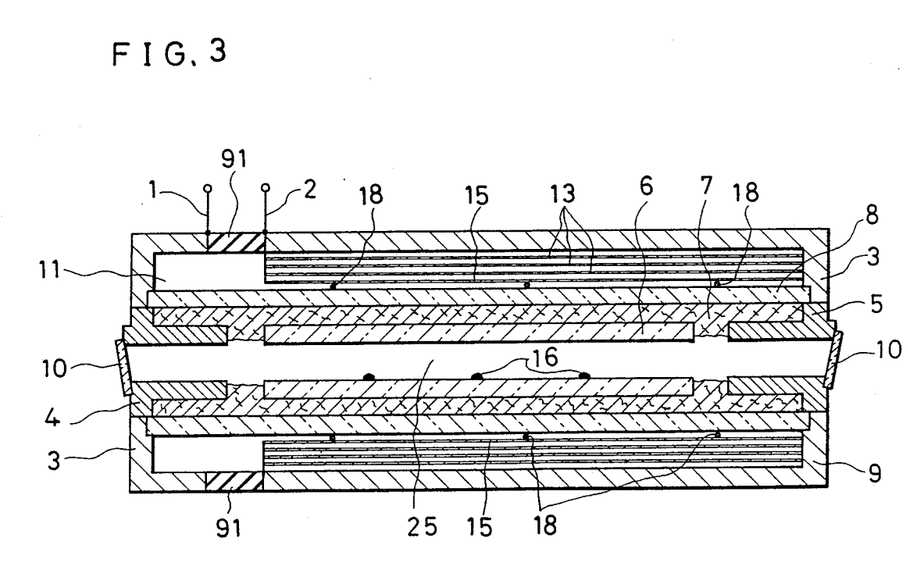
FIG. 3 is a sectional elevation view along axis of a metal jacket of a metal vapor laser of a second embodiment of the present invention.

FIG. 3 shows another embodiment of the present invention. The feature of this embodiment is that the innermost heat shield 15 of tubular metal sheet is held so as to have a uniform predetermined gap outside the seal tube 8 and insulated therefrom by inserting gap spacers 18, 18 between itself and the seal tube 8. The effect advantage of such retaining of predetermined gap over the seal tube 8 is elucidated in detail below. When a high voltage is impressed across the anode terminal 2 and the cathode terminal 1 of the metal vapor laser shown in FIG. 3, discharge is generated in the discharging region 25 which is between the anode 5 and the cathode 4, and besides, in the vacuum space 11, particularly between the innermost heat shield 15 and the outside face of the seal tube 8, if the gap between them is very narrow.

Figure 4:
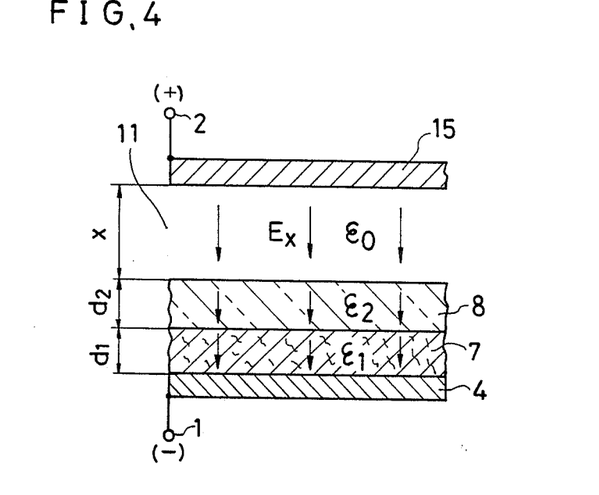
FIG. 4 is a schematic sectional view of an embodiment of the present invention for elucidating manner of electric field intensity distribution.

FIG. 4 schematically shows distribution of electric field when plural heat shields 13, 13 and 15 are disposed in the vacuum space 11, between the inner face of the metal jacket 9 and the outer face of the seal tube 8. In FIG. 4, when a voltage V is impressed across the innermost heat shield 15 and the cathode 4, wherebetween a vacuum space of thickness x and dielectric constant $\epsilon_0$ and the seal tube 8 of thickness $d_2$ and dielectric constant $\epsilon_2$ and the heat insulator 7 of thickness $d_1$ and dielectric constant $\epsilon_1$ are provided, the electric field $E_x$ generated in the vacuum space of gap x is given as follows.

$$E_x = \left(\frac{V_x}{x}\right) = \frac{V}{(\epsilon_0/\epsilon_1)d_1 + (\epsilon_0/\epsilon_2)d_2 + x}, \quad (3)$$

where $V_x$ is a voltage to be applied across the vacuum space of thickness x and V is a voltgage to be applied across the innermost heat shield 15 and the cathode 4.

From the above-mentioned equation, the electric field intensity of te vacuum space is inverse-proportional to its gap distance x. If the electric field intensity $E_x$ exceeds the discharge threshold value of vacuum space, a discharge is generated in the gap between the innermost electrode 15 and the surface of the seal tube 8. Such discharge causes sputtering on the surface of the seal tube 8 and hence causes deposition of sputtered particles from the surface of the seal tube 8 on the inside face of the innermost heat shield 15. Thereby optical reflectivity of the inside face of the innermost heat shield 15 is damaged, resulting in increase of heat radiation due to decrease of reflectivity of the radiation.

Figure 5:
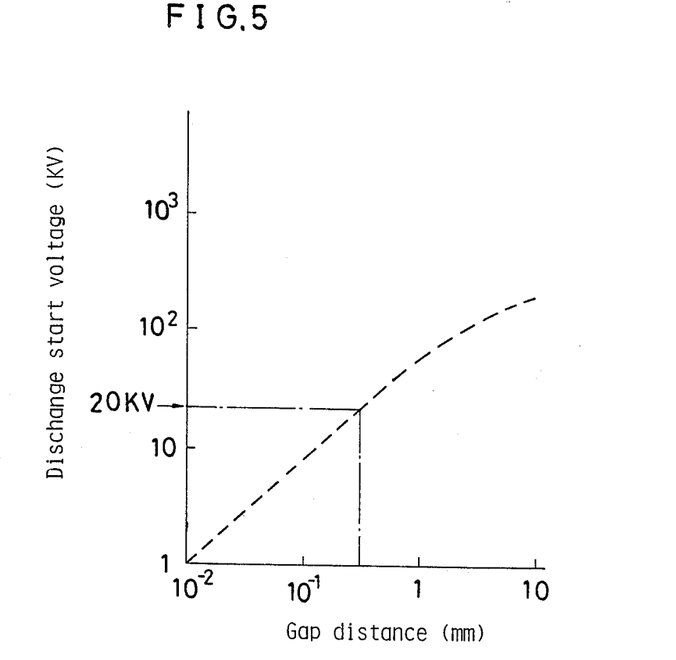
FIG. 5 is a graph showing known relation between gap distance and discharge start voltage in vacuum.

In order to solve the above-mentioned problem, this embodiment adopts a provision of insulative spacers to be disposed between the outside surface of the seal tube 8 and the inside face of the innermost heat shield 15, whose both ends are connected to the metal jacket 9. By provision of such insulative spacers, a precise predetermined uniform gas is assured between the outer surface of the seal tube 8 and the inside face of the inner most heat shield 15, thereby decreasing electric capacity between the gap, and preventing undesirable discharge across the gap in the vacuum space. FIG. 5 shows known relation between the gap distance (mm) and discharge start voltage in vacuum. As shown in FIG. 5, the discharge start voltage increases almost proportional to the gap distance until the gap distance becomes 10 mm. Accordingly, for the ordinary metal vapor laser using 20 KV of pulse voltage impressed across anode and cathode, by selecting the gap distance to be above 0.3 mm, undesirable discharge in the vacuum between the innermost heat shield 15 and the surface of the seal tube 8 is eliminated. Therefore, by providing the gap spaces of insulative material in the gap between the inside face of the innermost heat shield 15 and the outside face of the seal tube 8 so as to hold the gap sufficiently larger than 0.3 mm all over the surfaces, undesirable discharge is eliminated. And thereby, deterioration of the seal tube 8 is prevented and the optical characteristic of the heat seals 15, 13, 13 in the vacuum space 11 is retained stable for very long time, and stable and long period service of the metaL vapor laser is achievable.

Instead of the embodiment of FIG. 3, wherein separators 18, 18 . . . of insulative material are used, another mode of holding the uniform gap may be adopted. For instance, as shown in FIG. 2, by fixing both ends of the innermost heat shield 15 to respective appropriate portions of the metal jacket 3, the innermost heat shield 15 can be fixed firmly with retaining uniform gap against the surface of the seal tube 8.

Figure 6:
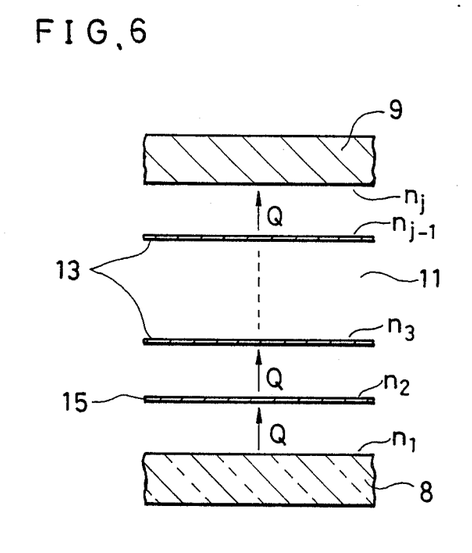
FIG. 6 is a schematic sectional view of an embodiment of the present invention for elucidating manner of heat radiation.

Still another embodiment is elucidated with reference to FIG. 6. In this embodiment, plural heat shields having at least one face of high optical reflectivity for heat radiation are used as the heat shield provided in the vacuum space 11 between the outside face of the seal tube 8 and the inside face of the metal jacket 3. The high reflectivity face is preferably on the inner face of the heat shield 13 or 15.

FIG. 6 shows an idealized one-dimensional model of heat radiation, wherein plural heat shields 13, 13 . . . and the innermost heat shield 15 are provided in a vacuum space 11 between the inside face of the metal jacket 9 and the outside face of the seal tube 8. Heat flow amount Q between two opposing faces are given as follows:

$$\frac{Q}{A} = \frac{1}{\frac{1}{\mu_1} + \frac{1}{\mu_2} - 1} \sigma(T_1^4 - T_2^4), \quad (4)$$

wherein
A is an area of heat radiation,
$\mu_1$, $\mu_2$ are heat radiation coefficients of respective surfaces,
$T_1$, $T_2$ are absolute temperatures of respective surfaces, and
$\sigma$ is Stefan-Boltzman constant.

Table 1 shows calculations of the heat flow amount model of FIG. 6, showing heat flow from the seal tube 7 towards metal jacket 9 through the plural heat shields 15 and 13, 13, . . . .

TABLE 1

| No. of heat shield | Sample No. 1 | Sample No. 2 | Sample No. 3 |
|---|---|---|---|
| $n_1$ (innermost) | Ma $T_1 = 1400$ | Ma $T_1 = 1400$ | Ma $T_1 = 1400$ |
| $n_2$ | Ma $T_2 = 1079$ | Ma $T_2 = 1250$ | Ma $T_2 = 1302$ |
| $n_3$ | Ma $T_3 = 20°$ C. | Ma $T_3 = 1076$ | Ma $T_3 = 1196$ |
| $n_4$ | | Ma $T_4 = 841$ | Ma $T_4 = 1076$ |
| $n_5$ | | Ma $T_5 = 20°$ C. | Ma $T_5 = 931$ |
| $n_6$ | | | Ma $T_6 = 729$ |
| $n_7$ (most outside) | | | Ma $T_7 = 20°$ C. |
| Q (KW) | 5.0 | 2.5 | 1.7 |

In FIG. 6, the marks $n_1, n_2, \ldots n_{j-1}, n_j$ show number (No.) of respective heat shields through respective heat seals 15, 13, .... In this model, it is provided that the heat shields are disposed with equal gap distances, and the first heat shield $n_1$ is directly contacting on the face of the seal tube 7 whose temperature is 1400° C., and the last heat shield $n_j$ is contacting the inside face of the metal jacket 9 whose temperature is 20° C., and all the heat shields are made of the same material, and the optical reflectivity is 0.85 (for molybdenum sheet).

As shown in Table 1 which shows result of calculation of the heat flow model of FIG. 6, in case of sample No. 2 which has two or more heat shields in comparison with the sample No. 1, the heat flow amount Q (KW) is about half of the sample No. 1. In case of No. 3 which has four more heat shields in comparison with the sample No. 1, the heat flow amount decreases such low to about ⅓ of that of sample No. 1. That is, by increasing number of heat shields, the radiation heat loss is drastically decreased. In the table, $T_1, T_2, T_3 \ldots T_7$ show temperatures in centigrade of respective heat shields.

In this embodiment, the effect of the heat shield is further improved by adopting heat shields having at least inside surface having optically high reflectivity and disposed with predetermined gap distances therebetween each other.

Table 2 shows heat flow amounts of various examples using other various combinations of heat shields.

TABLE 2

| No. of heat shields | Sample No. 4 | Sample No. 5 | Sample No. 6 | Sample No. 7 |
|---|---|---|---|---|
| $n_1$ (innermost) | Ma $T_1 = 1400°$ C. | Ma $T_1 = 1400°$ C. | Ma $T_1 = 1400°$ C. | Ma $T_1 = 1400°$ C. |
| $n_2$ | Ma $T_2 = 1316$ | Ma $T_2 = 1331$ | Ma $T_2 = 1340$ | Ma $T_2 = 1275$ |
| $n_3$ | Ma $T_3 = 1227$ | Ma $T_3 = 1260$ | Ma $T_3 = 1280$ | Mc $T_3 = 20$ |
| $n_4$ | Ma $T_4 = 1130$ | Ma $T_4 = 1187$ | Ma $T_4 = 1219$ | |
| $n_5$ | Ma $T_5 = 1020$ | Ma $T_5 = 1108$ | Mb $T_5 = 1100$ | |
| $n_6$ | Ma $T_6 = 886$ | Mb $T_6 = 931$ | Mb $T_6 = 870$ | |
| $n_7$ (most outside) | Mb $T_7 = 20$ | Mb $T_7 = 20$ | Mb $T_7 = 20$ | |
| Q (KW) | 1.5 | 1.1 | 0.9 | 1.5 |

As the metal sheet of the heat shields, three kinds of metal sheets were used. The innermost heat shield receives strongest radiation from the seal tube 8 of very high temperature originated from the discharge region 15 of above 1500° C. It is known that black body radiation energy, which is determined as a function of the temperature and wavelength, becomes maximum at a wavelength of $\lambda_{max} = 2$ μm in case the temperature is 1400° C. And therefore, in selecting the material of heat shields, such material having a high optical reflectivities for the wavelength of 1–5 μm range should be used. As shown by the samples No. 5 and No. 6 in the Table 2, by replacing a part of the metal sheet Ma such as molybdenum or the like ordinary hear-resistive metal (having the optical reflectivity of 0.85) by a metal of higher optical reflectivity as copper (having optical reflectivity of 0.95), the heat flow amount can be reduced much. That is, the heat flow amount of the sample No. 5 is reduced by 25%, and that of sample No. 6 is reduced by 40%, from that of the sample No. 4, thereby enabling the achievment of the same high temperature of the discharge region 25 by smaller heat energies of 1.1 KW and 0.9 KW in comparison with 1.5 KW of the sample No. 1. Furthermore, in the case of sample No. 5, the temperature of the sixth and seventh heat shields Mb can be made lower than 1085° C. melting point of copper. In case another metal sheet Mc which is a molybdenum or tantalum sheet having copper-plated surface (having optical reflectivity of 0.985) at least on the inside surface thereof made by vapor-deposition process, by using only three layers of the heat shields, the same heat flow amount of 1.5 KW as the sample No. 1 having seven heat shields is achievable. As the high reflectivity metal face, plated face of Cu, Ag or Au or combination of layers thereof or alloy thereof is usable. Thus, by using lower input power the predetermined temperature of the discharge region is achievable by raising the optical reflectivity of the metal sheets of the heat shields. And furthermore, through decrease of number of heat shields, the diameter of the metal jacket 9 can be reduced considerably, thereby enabling to provide a compact metal vapor laser apparatus.

Though the above-mentioned examples show the case of using metal sheet having surface of optically high reflectivity as only at least one or some of the surface of the heat shields, such metal face of high optical reflectivity can be used as the inside face of the metal jacket 9.

Still furthermore, in place of the metal sheets as the heat shields, a thin insulative sheet having the surface plated by the high optical reflective material may be used as the outer parts heat shields.

Figure 7:
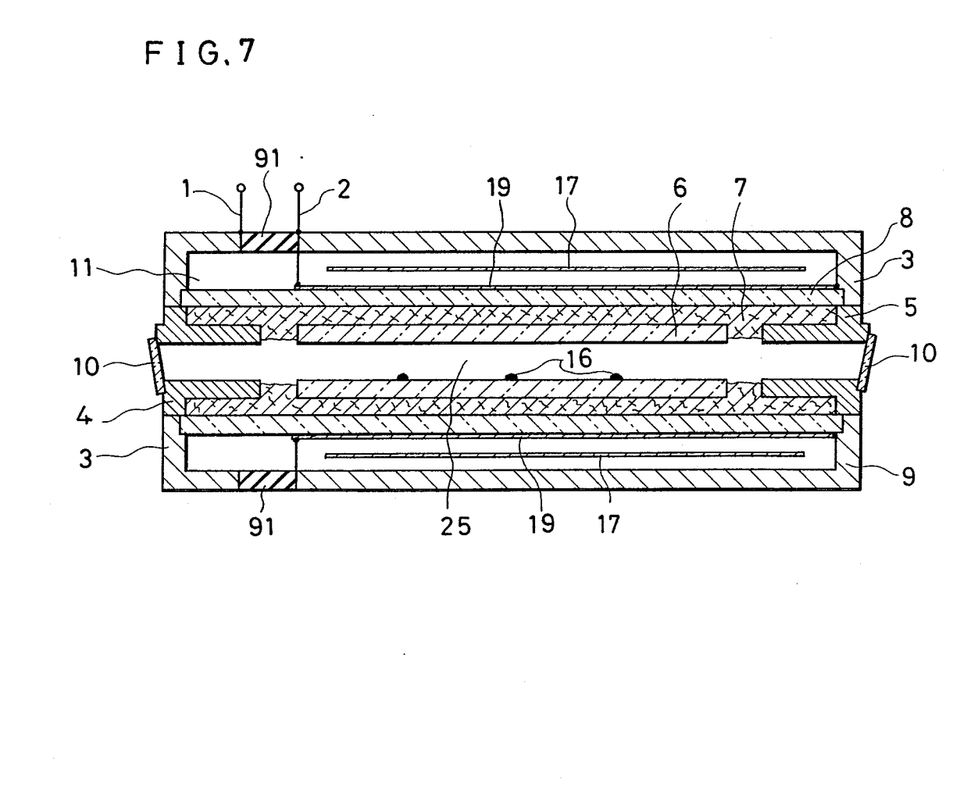
FIG. 7 is a sectional elevation view along axis of a metal jacket of a metal vapor laser of still another embodiment of the present invention.

FIG. 7 shows still another embodiment of the present invention. This embodiment purports to prevent undesirable discharge between the innermost heat shield and the outer surface of the seal 18. As has been described, even in the vacuum space 11, undesirable discharge takes place when electric field intensity exceeds a predetermined level which is given as a function of gap distance. The undesirable discharge in the vacuum space between the innermost heat shield and the outer surface of the seal tube 8 causes undesirable sputtering, thereby to deteriorate glossy surface and high optical reflectivity of the heat shield. In order to prevent such undesirable discharging, the innermost heat shield 19 of this embodiment is made by sputtering or vapor deposition of the metal directly on the outer surface of the seal tube 8. Thereby, the layer of the heat shield 19 is firmly bonded directly on the outside face of the seal tube 8 without any gap therebetween. Furthermore, in order to reduce inductance of discharge load, both ends of the innermost heat shield 19 formed tightly on the seal tube 8 is electrically connected to the metal jacket 9. The outer surface of the sputtered or vapor deposited film of high melting point has such a low emissivity as 0.3 in contrast to a high emissivity of 0.7 of the ceramic material of the seal tube 8. Since heat loss through radiation is proportional to the emissivity of the surface, the forming of the smooth metal film which is tightly bonded on the outer surface of the seal tube 8 makes the heat loss through the radiation very small. At least one other heat shield 17 is provided in the vacuum space 11 with a predetermined gap from the surface of the metal coating 19 formed on the seal tube 8. Therefore, a considerable part of the radiation is reflected thereby, and the heat loss through radiaion from the seal tube 8 to the outside metal jacket 9 can be drastically minimized. Therefore, the metal vapor laser of this embodiment can lase with small input power.

Figure 8:
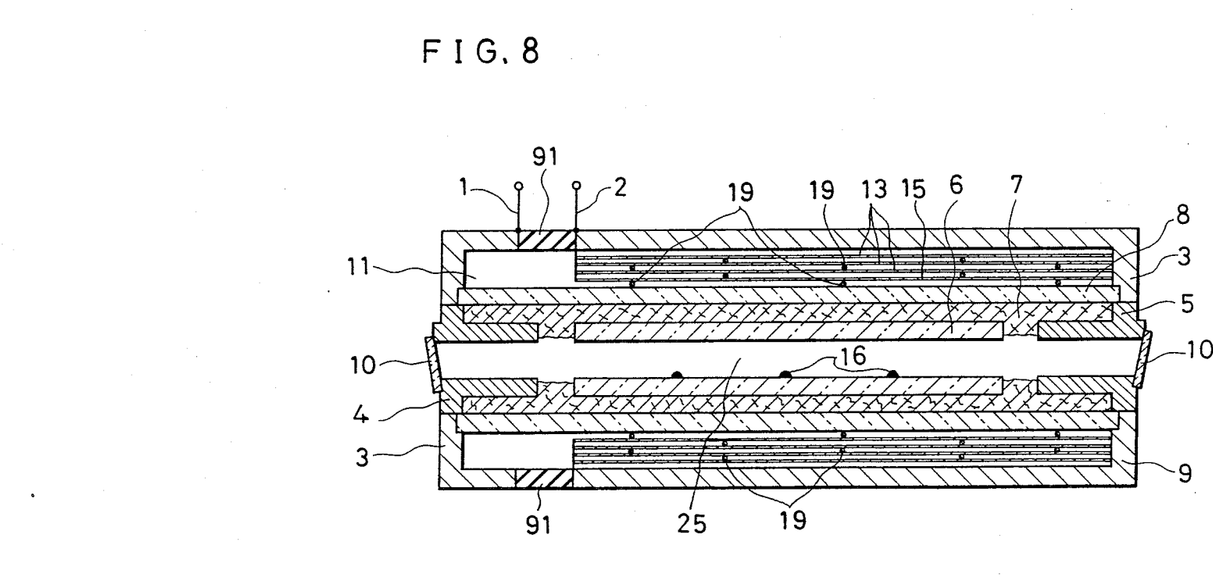
FIG. 8 is a sectional elevation view along axis of a metal jacket of a metal vapor laser of still another embodiment of the present invention.

FIG. 8 shows still another embodiment of the present invention. In this embodiment, plural heat shields 13 and 15 are held with predetermined gaps therebetween by providing appropriate number of separators 19, 19 . . . of low heat conductivity. The low heat conductivity separator is constituted as shown in FIG. 9, and thereafter.

Figure 9:
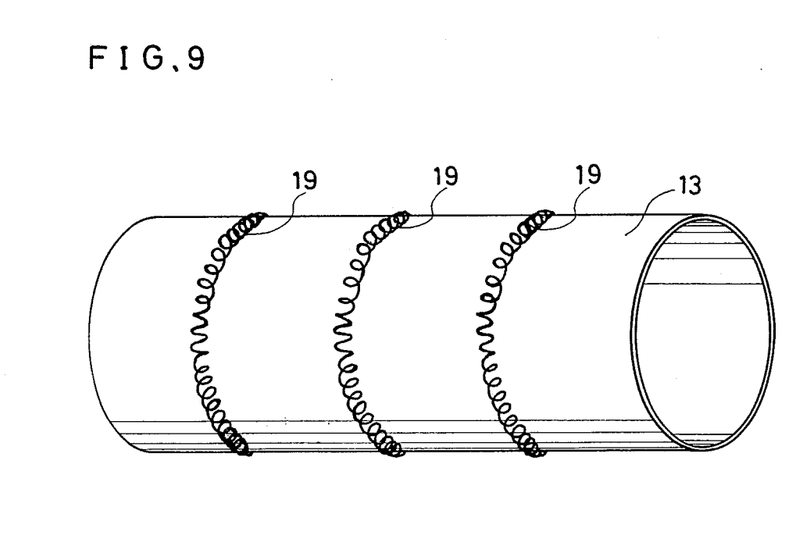
FIG. 9 is a perspective view showing an example of separators wound around a tubular heat shield.

The heat separator of FIG. 9 is a coiled fine metal wire of heat-resistive metal, such as molybdenum, tantalum or tungsten. In order to reduce heat conduction through te separator, the coiled wire should be as fine as possible, as far as the rigidity or separation function is assured thereby.

The heat conduction and heat insulation of the separator is described. The flow amount Q from a heat shield to another heat shield when using a conventional U-shaped metal spacers welded to both sides of the heat shields to be separated each other is given by the below-mentioned expression:

$$Q = -Ak\left(\frac{\Delta T}{\Delta x}\right), \quad (5)$$

where

A is sectional area of the welded metal spacer,
k is heat conductivity of the metal of the spacer,
$\Delta x$ is length of metal spacer,
$\Delta T$ is temperature difference between the inner heat shield and the outer heat shield.

As is obvious from the expression (5), the heat flow amount Q is proportional both to the areas A of welded spacers and to inverse of the length of the separator. As is obvious from the above, when the plural heat shields are separated by providing a number of short U-shaped metal separators which are welded at both sides to the neighboring heat shields, the total sectional area of the separators becomes considerably large. Since the length of each separator is very short and the total sectional area thereof is considerably large, the heat loss through the conduction becomes large. Furthermore, such weldings of many metal spacers to the heat shields takes considerable time. In contrast to the conventional separators, the embodiment adopts separators of fine coils which are not welded to the heat shields but are applied thereto by their own tensions as coiled wires are used. Therefore, the heat loss through conduction is greatly minimized, thereby enabling drastic decrease of the heat loss. By means of a simplified calculation, for a model of providing 10 pieces of conventional U-shaped welded metal separator having 2 mm width×2 mm length×50 μm thickness, a normalized heat flow $$K\frac{Q}{\Delta T}$$

of about $5\times10^{-1}$ (mm) is made, whereas an embodiment model of coiled wire of 0.1 mm $\phi$ disposed around a 100 mm $\phi$ heat shield touching at 30 points on the heat shield has a normalized heat flow $$K\frac{Q}{\Delta T}$$

of about $2.4\times10^{31\ 3}$ (mm). That is, the coiled fine wire separator has such a small heat conduction of 1/20 of that of the conventional U-shaped welded metal separator.

Figure 10A:
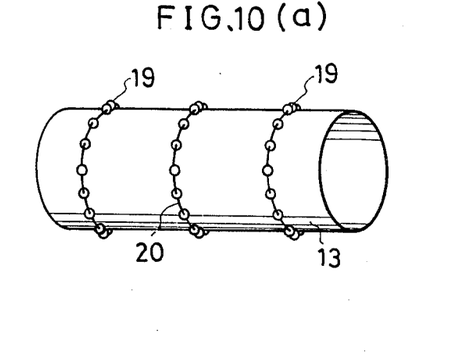
FIG. 10(a) is a perspective view showing an example of separators wound around a tubular heat shield.
Figure 10B:
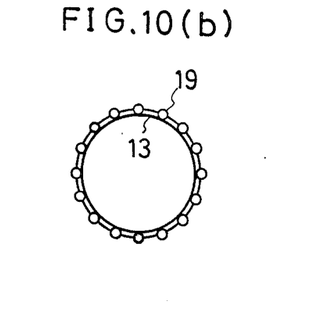
FIG. 10(b) is a front view of the separator and the heat shield of FIG. 10(a).

FIG. 10(a) and FIG. 10(b) show another embodiment of the separator. The separator comprises a number of spherical ceramic or glass beads 19 of electrically and thermally insulative nature, threaded by fine wire 20 of heat resistive metal such as Mo, Ta or W, and wound around the heat shield 13. Since this separator is of insulative material, the separator can be used between the outer face of the seal tube 8 and the inner face of the innermost heat shield 15, where the highest insulation is required, as far as the radius of the beads 19 is appropriately selected considering the discharge-start voltage vs. gap distance relation in the vacuum space.

Figure 11A:
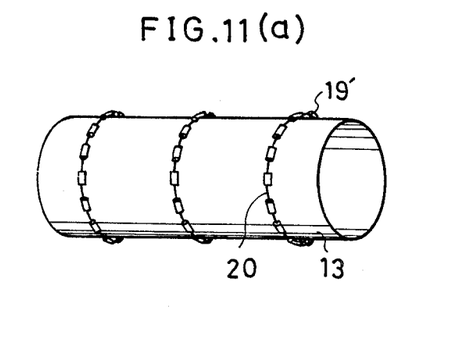
FIG. 11(a) is a perspective view showing an example of separators wound around a tubular heat shield.
Figure 11B:
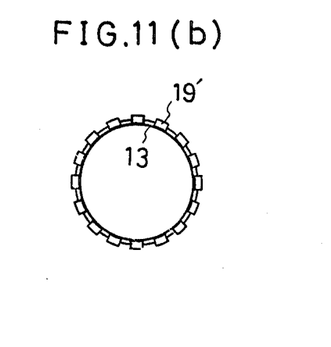
FIG. 11(b) is front view of the separator and the heat shield of FIG. 11(a).

FIG. 11(a) and FIG. 11(b) show another embodiment of the separator. The separator comprises a number of short cylindrical ceramic or glass beads 19' of electrically and thermally insulative nature, threaded by fine wire 20 of heat resistive metal such as Mo, Ta or W, and wound around the heat shield 13. Since this separator is of insulative material, the separator can be used between the outer face of the seal tube 8 and the inner face of the innermost heat shield 15, where the highest insulation is required, as far as the radiius of the beads 19' is appropriately selected considering the discharge-start voltage vs. gap distance relation in the vacuum space.

Figure 12A:
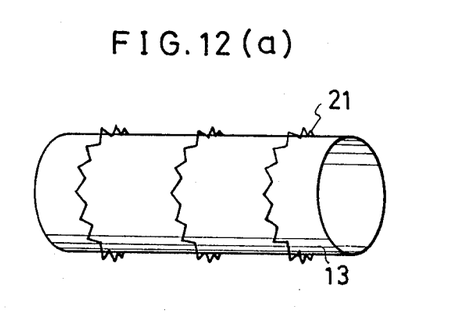
FIG. 12(a) is a perspective view showing an example of separators wound around a tubular heat shield.
Figure 12B:
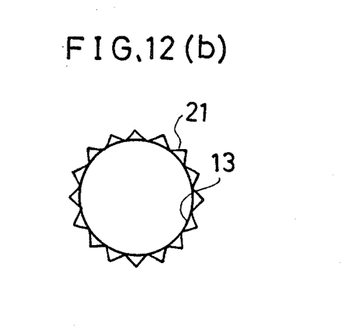
FIG. 12(b) is a front view of the separator and the heat shield of FIG. 12(a).

FIG. 12(a) and FIG. 12(b) show still another embodiment of the separator. The separator is made of heat-resistive wire 21 formed in a circle with many zigzag parts thereon, so that when it is applied around the heat shield 13 or 15, the wire touches only at corners of the zigzag shape, by point-contacts. Therefore, the area of contacts to the heat shield 13 or 15 is very small. The contacts to the inner face of the outside heat shield applied therearound is also of small area. Therfore, the heat loss through conduction is very small. The zigzag wire may be divided into two or more sections around the cylinder of the heat shield; but in such case each divided sector of the zigzag formed wire must be fixed to the face of the heat shield 13 or 15 by welding or the like means.

Although the invention has been described in its preferred form with a certain degree of particularity, it is understood that the present disclosure of the preferred form has been change in the details of construction and the combination and arrangement of parts may be resorted to without departing from the spirit and the scope of the invention as hereinafter claimed.

What is claimed is:
1. A metal vapor laser comprising:
a first electrode, a second electrode which are disposed apart each other in axial direction with a discharge region therebetween, a seal tube of an insulative substance for containing said first electrode and said second electrode therein.

a predetermined amount of metal to be vaporized by discharging in the discharge region.

an metal jacket enclosing the above-mentioned members therein and defining a vacuum space therein surrounding said seal tube, and at least one heat shield disposed in said vacuum space in a manner to surround said seal tube and apart from outer face of said seal tube and from each other, both ends of at least one of said heat shield being electrically connected to said metal jacket.

2. A metal vapor laser in accordance with claim 1, wherein plural heat shields are provided.

3. A metal laser in accordance with claim 1, wherein both ends of the innermost heat shield is electrically connected to said metal jacket.

4. A metal vapor laser in accordance with claim 3, wherein said innermost heat shield is held apart from the outer face of said seal tube with a predetermined gap inbetween.

5. A metal vapor laser in accordance with claim 4, wherein said predetermined gas is held by providing gap spacers of insulative substance in said gap.

6. A metal vapor laser in accordance with claim 1, wherein at least ne heat shield has a face of optically high relectivity at least on the inner face thereof.

7. A metal vapor laser in accordance with claim 6, wherein plural layers of said heat shields are provided with predetermined gaps to each other.

8. A metal vapor laser in accordance with claim 6, wherein at least one of said heat shield is made of heat-resistive metal at least at the outer face side and has an inner face of optically high-reflectivity metal.

9. A metal vapor laser in accordance with claim 6, wherein p1 said face of optically high refectivity is made of Cu, Ag or Au or combination thereof.

10. A metal vapor laser in accordance with claim 6, wherein said heat-resistive metal is Mo, Ta or W.

11. A metal vapor laser n accordance with claim 1 which further comprises:

a heat shielding layer formed tightly on the outer surface of said seal tube, and connections electrically connecting both ends of said heat shielding layer to said metal jacket.

12. A metal vapor laser in accordance with claim 11, wherein said heat shielding layer is formed by vapor deposition of heat-resistive metal.

13. A metal vapor laser in accordance with claim 11, wherein said heat shielding layer is formed by sputtering of heat-resistive metal.

14. A metal vapor laser in accordance with claim 1 which further comprises:

a heat shielding layer formed on the inner surface of said metal jacket.

15. A metal vapor laser in accordance with claim 1 which further comprises:

gap spacers to hold a predetermined gaps between neighboring heat shields.

16. A metal vapor laser in accordance with claim 15, wherein said gap spacers are coils of fine wire of heat-resistive metal.

17. A metal vapor laser in accordance with claim 15, wherein said gap spacers are zigzag formed ring of fine wire of heat-resistive metal.

18. A metal vapor laser in accordance with claim 15, wherein said gap spacers are a number of ceramic beads threaded by a fine wire of heat-resistive metal.

* * * * *